(12) United States Patent
Beutler et al.

(10) Patent No.: US 6,957,918 B2
(45) Date of Patent: Oct. 25, 2005

(54) AXLE SHAFT ASSEMBLY

(75) Inventors: Kevin Ray Beutler, Columbiaville, MI (US); Blair James Swanson, Oxford, MI (US); Jeffrey Eugene Rea, Clarkston, MI (US); Robert Allen Dunn, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 150 days.

(21) Appl. No.: 10/694,527

(22) Filed: Oct. 27, 2003

(65) Prior Publication Data

US 2005/0088037 A1 Apr. 28, 2005

(51) Int. Cl.[7] .......................... F16C 32/00; F16C 43/04
(52) U.S. Cl. ....................... 384/448; 384/519; 384/540
(58) Field of Search ................ 384/448, 544, 384/540, 519, 517; 411/427; 301/124.1, 301/109

(56) References Cited

U.S. PATENT DOCUMENTS

| | | | |
|---|---|---|---|
| 1,893,836 A | * | 1/1933 | Baninger .................... 384/517 |
| 4,478,029 A | * | 10/1984 | Moore et al. ................. 56/17.5 |
| 5,011,302 A | | 4/1991 | Mott et al. |
| 5,711,393 A | | 1/1998 | Gage |
| 5,797,686 A | * | 8/1998 | Kawamura et al. ......... 384/544 |
| 5,816,711 A | | 10/1998 | Gingrich |
| 5,984,422 A | | 11/1999 | Seifert |
| 6,196,639 B1 | * | 3/2001 | Di Ponio et al. ........ 301/105.1 |
| 6,280,093 B1 | | 8/2001 | Ohtsuki et al. |
| 6,287,009 B1 | | 9/2001 | Nakamura et al. |
| 6,343,878 B1 | | 2/2002 | Ouchi |
| 6,695,483 B2 | * | 2/2004 | Sakatani et al. ............ 384/448 |
| 2004/0027117 A1 | * | 2/2004 | Spingler ................ 324/207.25 |

* cited by examiner

*Primary Examiner*—Thomas R. Hannon
(74) *Attorney, Agent, or Firm*—Harness, Dickey & Pierce P.L.C.

(57) ABSTRACT

An axle shaft assembly for a motor vehicle has a bearing unit, an axle shaft, and a bearing retainer. The axle shaft is supported within the wheel bearing unit. The axle shaft has an outer diameter. The bearing retainer is mounted on the axle shaft and abuts the wheel bearing unit. The bearing retainer has a piloting feature for aligning the bearing retainer with respect to the axle shaft. The piloting feature includes a pilot surface with an inner diameter approximately equal to the outer diameter of the axle shaft.

20 Claims, 2 Drawing Sheets

AXLE SHAFT ASSEMBLY

FIELD OF THE INVENTION

The present invention generally relates to axle shaft assemblies and more particularly to an arrangement for mounting the rotating component of a wheel speed sensor to an axle shaft.

BACKGROUND OF THE INVENTION

Modern automotive vehicles are commonly equipped with systems that provide enhanced performance and/or control of the vehicle, such as anti-lock brakes, traction control and stability control. These systems typically monitor the rotational speed of each of the vehicle wheels to determine the onset or occurrence of wheel slip. Generally speaking, the sensor for each wheel includes a rotating component, such as an exciter ring or slotted disk, that rotates with its associated wheel and a stationary component that is fixed to the vehicle in a stationary position relative to the rotating component. In one common arrangement, the rotating component is captured or coupled to an axle shaft via a bearing retainer, while the stationary component is fixedly coupled to an axle shaft housing in which the axle shaft is rotatably housed.

While the foregoing arrangement is known to work for its intended purpose, we have found that it is none the less susceptible to improvement. Specifically, this arrangement has heretofore required extremely tight tolerancing of the threaded portions of the bearing retainer and the axle shaft to ensure that the rotating component is centered about the rotational axis of the axle shaft. This tolerance (e.g. 4H5H class threads) is known to be relatively costly to produce.

Accordingly, there remains a need in the art for an improved arrangement for mounting the rotating component of a wheel speed sensor to an axle shaft.

SUMMARY OF THE INVENTION

An axle shaft assembly for a motor vehicle is provided. The axle shaft assembly includes a bearing unit, an axle shaft, and a bearing retainer. The axle shaft is supported within the wheel bearing unit. The axle shaft has an outer diameter. The bearing retainer is mounted on the axle shaft and abuts the wheel bearing unit. The bearing retainer has a piloting feature for aligning the bearing retainer with respect to the axle shaft. The piloting feature includes a pilot surface with an inner diameter approximately equal to the outer diameter of the axle shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
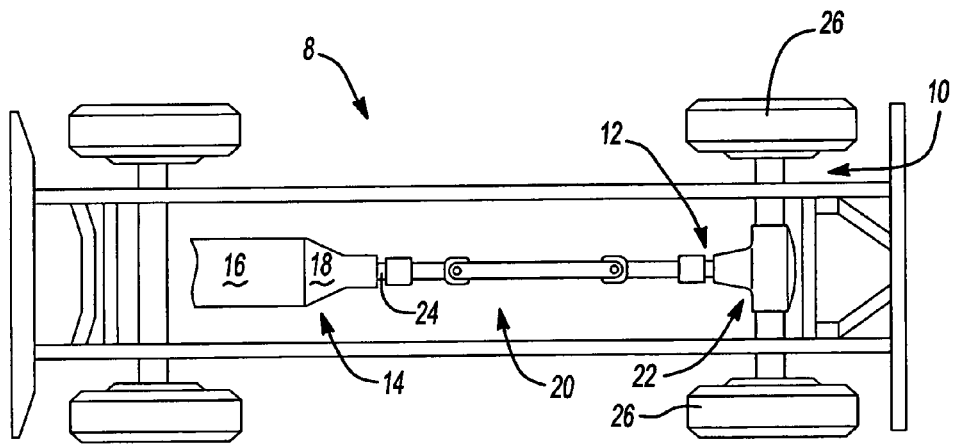
FIG. 1 is a schematic illustration of an exemplary vehicle having an axle shaft assembly constructed in accordance with the teachings of the present invention.

With reference to FIG. 1 of the drawings, an exemplary vehicle 8 is illustrated to include an axle shaft assembly 10 that is constructed in accordance with the teachings of the present invention. The vehicle 8 also includes a driveline 12 driven by a powertrain 14. The powertrain 14 includes an engine 16 and a transmission 18. The driveline 12 includes a propshaft assembly 20 and a rear axle differential 22.

The engine 16 is mounted in an in-line or longitudinal orientation along the axis of the vehicle 8. The output of the engine 16 is selectively coupled via a conventional clutch (not specifically shown) to the input of the transmission 18 in order to transmit rotary power therebetween. The input of the transmission 18 is commonly aligned with the output of the engine 16 for rotation about a rotary axis. The transmission 18 further includes an output 24 coupled for rotation to the propshaft assembly 20. Drive torque is transmitted through the propshaft assembly 20 to the rear axle differential 22 where it is selectively transferred to the axle shaft assembly 10 and on to wheels 26.

The axle shaft assembly 10 is employed to couple the driveline 20 with the wheels 26 while providing various features such as bearing support of the wheels 26 and determining the rotational speed of the wheels 26 for an anti-lock braking system, all of which will be described below.

Figure 2:
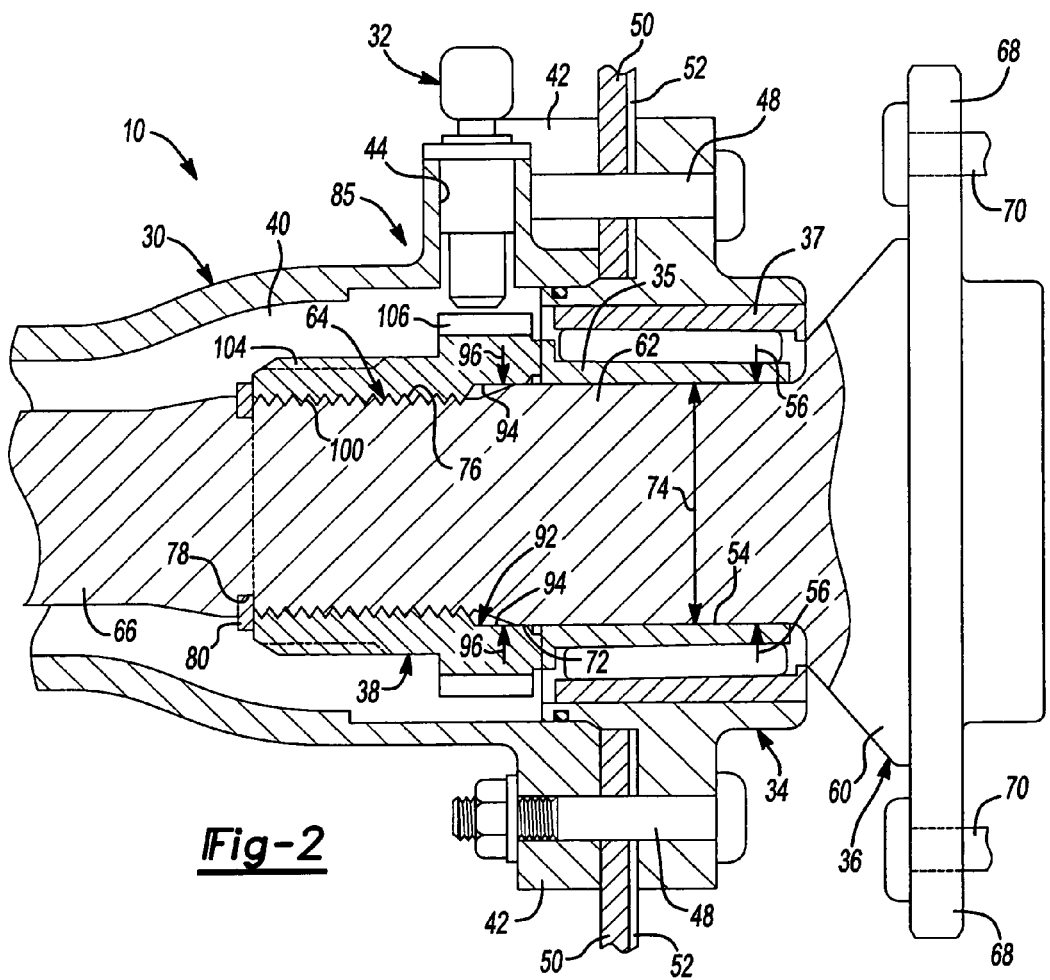
FIG. 2 is an exploded cross sectional view of the axle shaft assembly.

In FIG. 2, the axle shaft assembly 10 is illustrated in greater detail. In the example provided, the axle shaft assembly 10 is illustrated to include an axle tube 30, an anti-lock braking system sensor (hereinafter ABS sensor) 32, a wheel bearing unit 34, an axle shaft 36, and a bearing retainer 38.

The axle tube 30 is generally cylindrically shaped and defines a cavity 40. The axle tube 30 is mounted at one end to the rear differential 22 (FIG. 1) and includes flanges 42 at an opposite end. A port 44 is formed in the axle tube 30 proximate to the flanges 42 and extends into the cavity 40. The ABS sensor 32 is mounted within the port 44 such that a portion of the ABS sensor is located within the cavity 40. In the particular example provided, the ABS sensor uses a Hall effect, as is known by those skilled in the art, to determine the rotational speed of the axle shaft 36 (and in turn the wheel 26). Specifically, in the embodiment illustrated, the ABS sensor 32 is aligned with the bearing retainer 38 and magnetically interacts with a portion of the bearing retainer 38 in order to permit the wheel speed sensor 32 to sense rotation of the axle shaft 36 and generate a sensor signal in response thereto. It is to be understood, however, that various other devices for sensing the rotational speed of the axle shaft 36 may be employed using, for example, inductive pick-ups, variable reluctance sensors, or slotted disk light sensor devices.

The wheel bearing unit 34 is mounted to the axle tube 30 at the flanges 42. In the particular example provided, bolts 48 extend through the wheel bearing unit 34 into the flanges 42 to secure the wheel bearing unit 34 to the axle tube 30. However, various other methods of coupling the wheel bearing unit 34 to the axle tube 30 may be employed.

Moreover, as illustrated, a brake attachment plate 50 with a brake dust shield 52 is mounted on the bolts 48 between the axle tube 30 and the wheel bearing unit 34. The brake attachment plate 50 provides a structure for mounting wheel brakes (not shown). The brake dust shield 52 prevents brake dust from filtering towards the ABS sensor 32 and interfering with its ability to accurately determine the rotational speed of the axle shaft 36.

The wheel bearing unit 34 is a conventional bearing unit having an inner race 35, an outer race 37, and roller elements (not shown). The wheel bearing unit 34 defines a bore 54 that is sized to receive and support for rotation a portion of the axle shaft 36, as will be described further below. The bore 54 is free to rotate relative to the rest of the wheel bearing unit 34 and has an inner diameter indicated by reference numeral 56 in FIG. 2.

The axle shaft 36 is generally cylindrical in shape and includes a hub portion 60, a bearing portion 62, a threaded portion 64, and a shaft portion 66. The hub portion 60 generally extends laterally or radially outwardly from the motor vehicle 8 (FIG. 1) and includes a radial flange 68. One of the wheels 26 (FIG. 1) is mounted to the radial flange 68 via studs 70.

The bearing portion 62 extends out from the hub portion 60 into the bore 54 of the wheel bearing unit 34. The bearing portion 62 extends through the wheel bearing unit 34 such that a portion of the bearing portion 62, indicated by reference numeral 72, extends beyond the wheel bearing unit 34. The bearing portion 62 has an outer diameter indicated by reference numeral 74. The outer diameter 74 and the inner diameter 56 are sized to provide an interference fit between the bore 54 and the bearing portion 62. In this way, the wheel bearing unit 34 supports the axle shaft 36 at the bearing portion 62 while allowing the axle shaft 36 to freely rotate.

The threaded portion 64 extends out from the bearing portion 62. The threaded portion 64 has a thread 76 formed thereon. In the example illustrated, the thread 76 has a 6H thread. Alternatively, a less precise thread may be employed due to the piloting feature of the present invention which will be described below. A groove 78 is formed at a distal end of the threaded portion 64 for receiving a snap ring 80.

The shaft portion 66 extends out from the threaded portion 64. The shaft portion 66 is coupled to the rear differential 22 (FIG. 1) and receives the drive torque from the powertrain 14 (FIG. 1) therethrough.

Figure 3:
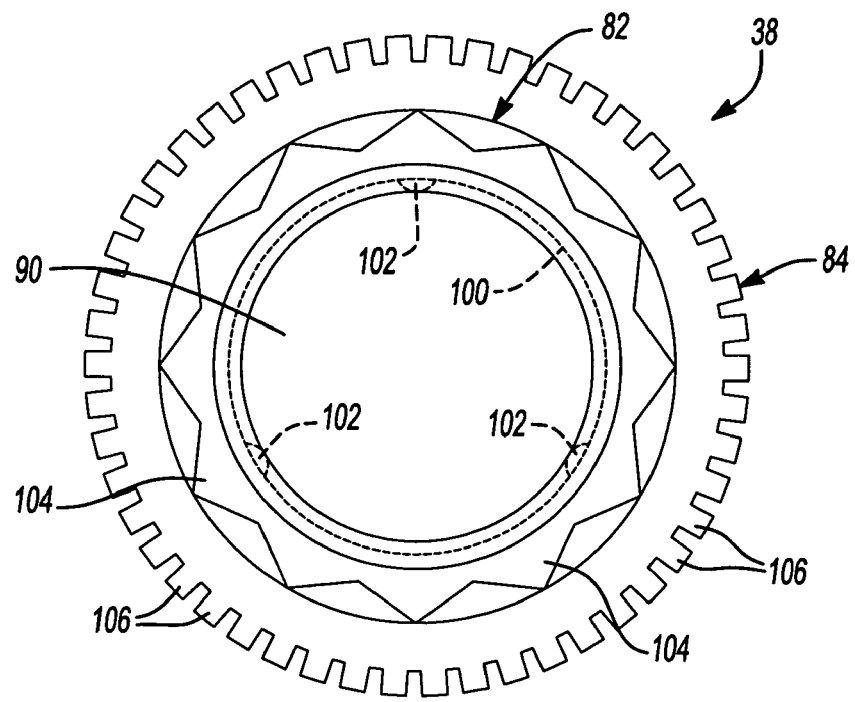
FIG. 3 is a rear view of a bearing retainer used in the axle shaft assembly shown in FIG. 2.
Figure 4:
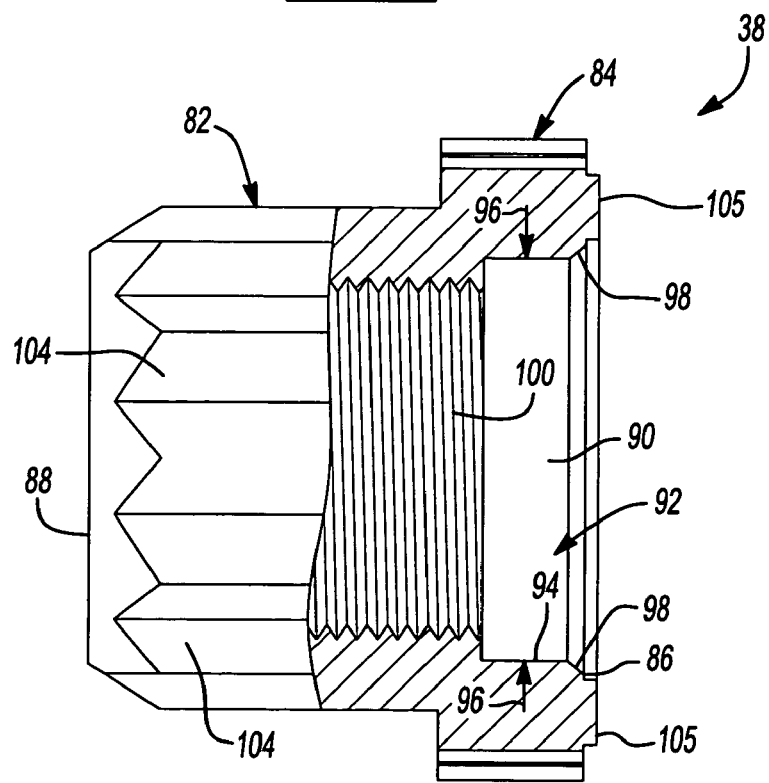
FIG. 4 is a side cross sectional of the bearing retainer shown in FIG. 3.

With reference now to FIGS. 3 and 4, the bearing retainer 38 is illustrated to include a nut portion 82 and a tone wheel portion 84. The tone wheel portion 84 extends around the nut portion 82 at an end thereof. The tone wheel portion 84, along with the ABS sensor 32, form a wheel speed sensor 85.

The nut portion 82 is generally cylindrical and includes a front end 86 and a back end 88. The nut portion 82 defines a bore 90 extending from the front end 86 to the back end 88 sized to fit on the axle shaft 36.

A piloting feature 92 is formed on the inner surface of the bore 90. The piloting feature 92 includes a pilot surface 94 extending into the bore 90 from the front end 86 circumferentially around the bore 90. The pilot surface 94 has an inner diameter indicated by reference numeral 96 in FIG. 4. As will be described in greater detail below, the inner diameter 96 is approximately equal to the outer diameter 74 of the axle shaft. A chamfered edge 98 transitions the pilot surface 94 to the front end 86.

A thread 100 is formed within the bore 90 and extends from the pilot surface 94 to the back end 88. The thread 100 is sized to match the thread 76 formed on the axle shaft 36 (e.g. 6H thread or less). In the particular example provided, a crown lock feature 102 is formed within the thread 100 near the back end 88, seen in FIG. 3. The crown lock feature 102 provides an interference fit between the threads 76, 100 such that the bearing retainer 38 is fixed to the axle shaft 36 when fully tightened.

In the particular example provided, the outer surface of the nut portion 82 includes drive flanks 104 formed thereon. The drive flanks 104 provide a grip surface for a socket wrench (not shown) used to tighten the bearing retainer 38 onto the axle shaft 36, as will be described in greater detail below. A shoulder 105 is formed on the front end 86 and engages the wheel bearing unit 34 as will be described below.

The tone wheel portion 84 is, as mentioned above, formed circumferentially around the nut portion 82 near the front end 86. The tone wheel portion 84 includes a plurality of teeth 106, as best seen in FIG. 3, extending radially outwards from the bearing retainer 38. The plurality of teeth 106 are spaced apart at equal intervals. Rotation of the plurality of teeth 106 as the axle shaft 36 rotates relative to the stationary ABS sensor 32 creates an electromagnetic field (EMF) effect in the ABS sensor 32. The frequency of the induced EMF is proportional to the rotational speed of the axle shaft 36. In this way, the wheel speed sensor 85 determines the rotational speed of the wheel 26 (FIG. 1) from the ABS sensor 32 sensing the rotation of the bearing retainer 38.

In the embodiment illustrated, the nut portion 82 and the tone wheel portion 84 are unitarily formed. However, the nut portion 82 and the tone wheel portion 84 could be formed separately as two parts and then combined in a later process. Moreover, it is to be understood that various other methods and materials may be employed in forming the bearing retainer 38.

With reference again to FIG. 2, the bearing retainer 38 is mounted on the threaded portion 64 of the axle shaft 36. The piloting feature 92 helps align the bearing retainer 38 with the axle shaft 36. Specifically, the pilot surface 94 aligns with the portion 72 of the bearing portion 62 extending beyond the wheel bearing unit 34. By matching the inner diameter 96 with the outer diameter 74, the bearing retainer 38 is forced to align with the axle shaft 36. The chamfer edge 98 (FIG. 4) helps align the bearing retainer 38 with the bearing portion 62. A socket (not shown) then engages the drive flanks 104 and tightens the bearing retainer 38 onto the threaded portion 64. The bearing retainer 38 is tightened to a predetermined fastening specification. The crown locking feature 102 (FIG. 3) will typically engage prior to seating the bearing retainer 38 and secure the bearing retainer 38 to the axle shaft 36. After tightening, the snap ring 80 is fitted within the groove 78 of the axle shaft 36 in order to assure that the bearing retainer 38 cannot fall off during use.

When the bearing retainer 38 is fully engaged onto the threaded portion 64, the shoulder 105 abuts the wheel bearing unit 34 and preloads the races 35, 37 of the wheel bearing unit 34. Specifically, the shoulder 105 abuts the inner race 35. Moreover, the tone wheel portion 84 and teeth 106 are aligned with the ABS sensor 32. The teeth 106 are rotated with rotation of the axle shaft 36 and are detectable by the ABS sensor 32.

Preferably, the inner diameter 96 of the piloting feature 92 is designed and manufactured with a line-to-line fit with the outer diameter 74 or having a diametrical clearance of approximately 0.0036 inches to 0.0064 inches therebetween. This clearance is less than the air gap tolerance of the ABS sensor 32 and allows the use of a less precise thread size on the axle shaft 36 and the bearing retainer 38.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An axle shaft assembly for a motor vehicle comprising:
   a bearing unit;
   an axle shaft rotatably supported by the wheel bearing unit, the axle shaft having an outer diameter; and
   a bearing retainer mounted on the axle shaft and abutting the wheel bearing unit, the bearing retainer having a piloting feature for aligning the bearing retainer with respect to a rotational axis of the axle shaft, the piloting feature including a pilot surface with an inner diameter approximately equal to the outer diameter of the axle shaft.

2. The axle shaft assembly of claim 1, wherein the inner diameter is about 0.0035 inch to about 0.0064 inch larger than the outer diameter of the axle shaft.

3. The axle shaft assembly of claim 1, wherein the bearing retainer includes a shoulder formed thereon, the shoulder engages the wheel bearing unit and applies a preload to the wheel bearing unit.

4. The axle shaft assembly of claim 1, wherein the bearing retainer includes a chamfered edge extending from the pilot surface to an end of the bearing retainer.

5. The axle shaft assembly of claim 1, wherein the bearing retainer includes a plurality of drive flanks formed thereon.

6. The axle shaft assembly of claim 1, wherein the axle shaft includes a thread portion and the bearing retainer includes a thread portion matched to the thread portion of the axle shaft.

7. The axle shaft assembly of claim 6, wherein the thread portion is less restrictive than a class 6H thread.

8. The axle shaft assembly of claim 1, further comprising an anti-lock braking sensor mounted to a tubular sheath surrounding the axle shaft, the anti-lock braking sensor capable of detecting the rotational speed of the axle shaft.

9. The axle shaft assembly of claim 8, wherein the bearing retainer includes a tone wheel with plurality of teeth extending radially outward and detectable by the anti-lock braking sensor.

10. The axle shaft assembly of claim 1, further including a snap ring mounted to the axle shaft for securing the bearing retainer to the axle shaft.

11. A bearing retainer adapted to be mounted on an axle shaft in a motor vehicle, the bearing retainer comprising:
    a nut portion defining a bore with a thread formed within the bore adapted to engage a thread formed on the axle shaft, the thread having a locking feature adapted to lock the bearing retainer to the axle shaft;
    a tone wheel portion extending around the nut portion and including a plurality of teeth extending radially out from the nut portion; and
    a piloting feature formed within the bore and including a pilot surface adapted to align the bearing retainer to the axle shaft and a chamfer edge for assisting in aligning the bearing retainer to the axle shaft.

12. An axle shaft assembly for a motor vehicle comprising:
    an axle shaft having an outer diameter with a piloting feature formed thereon;
    a bearing unit for rotatably supporting the axle shaft;
    a bearing retainer threadably coupled to the axle shaft; and
    a rotating component of a wheel speed sensor, the rotating component being located between the bearing retainer and the bearing unit, the rotating component including a complementary piloting feature that cooperates with the piloting features on the axle shaft to align the rotating component to a rotational axis of the axle shaft;
    wherein at least one of the piloting feature and complementary piloting feature is tapered about at least a portion of its circumference.

13. The axle shaft assembly of claim 12, wherein one of the piloting feature is at least partially tapered and the complementary piloting feature includes a cylindrical bore that is sized to at least partially receive the tapered portion of the piloting feature.

14. The axle shaft assembly of claim 12, wherein the piloting feature further includes a cylindrical stem and wherein the cylindrical bore at least partially receives the cylindrical stem.

15. The axle shaft assembly of claim 14, wherein a nominal size of the cylindrical stem is sized less than about 0.01 inch smaller than a nominal size of the cylindrical bore.

16. The axle shaft assembly of claim 15, wherein the nominal size of the stem is less than about 0.005 inch smaller than the nominal size of the cylindrical bore.

17. The axle shaft assembly of claim 12, wherein the rotating component and the bearing retainer are unitarily formed.

18. The axle shaft assembly of claim 17, wherein a plurality of teeth extend radially outwardly from a body of the rotating component.

19. The axle shaft assembly of claim 18, wherein an abutting shoulder is formed on the rotating component, the abutting shoulder contacting the bearing unit at a predetermined location so as to axially space the teeth apart from the bearing unit.

20. An axle shaft assembly for a motor vehicle, comprising:
    an axle shaft; and
    a wheel speed sensor having a rotating component and a stationary component, the rotating component being configured to rotate with the axle shaft, the rotating component having an internally threaded portion adapted to engage a thread formed on the axle shaft, the rotating component further including a pilot feature formed thereon for aligning the rotating component with the axle shaft.

* * * * *